Nov. 17, 1959     V. L. WESTBERG     2,913,661
SPEED INDICATOR AND SYNCHRONIZER
Filed May 22, 1956
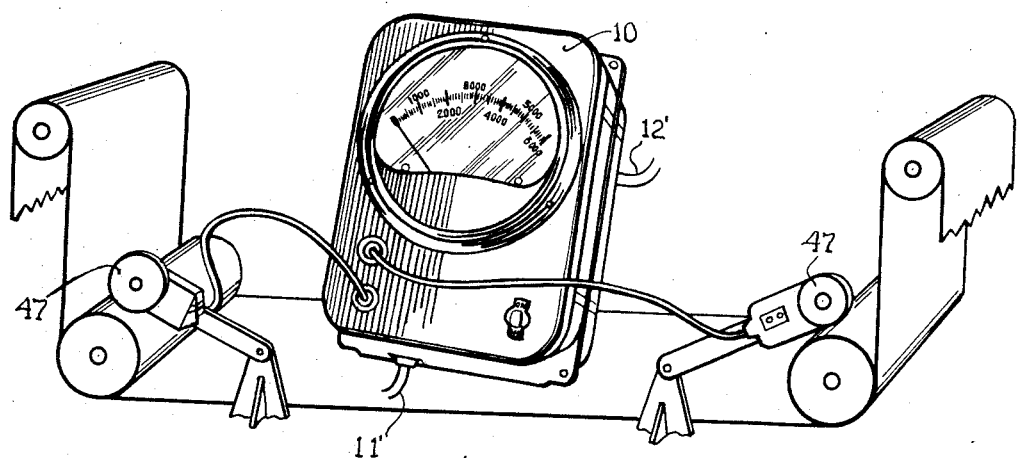
Fig. 1.
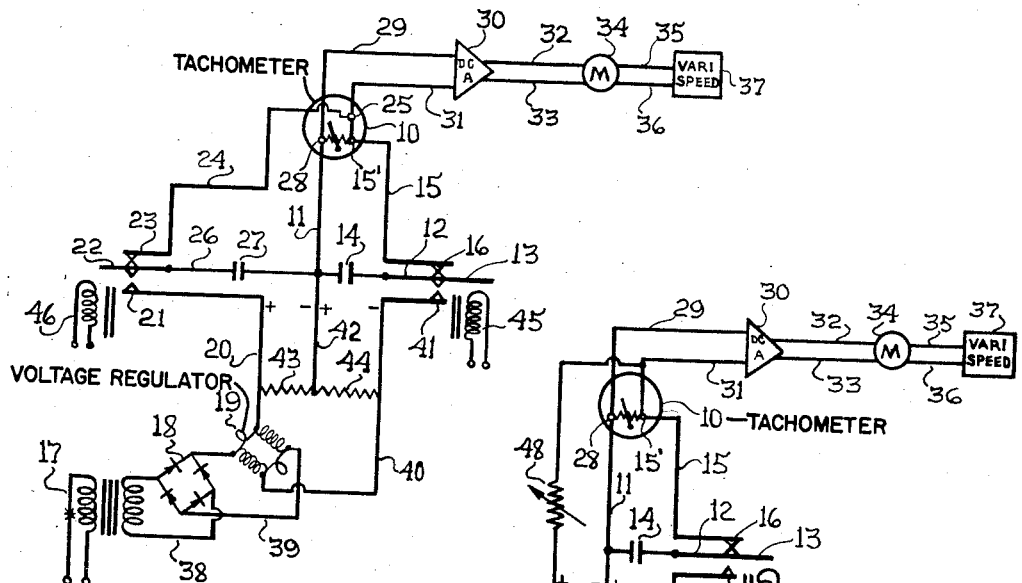
Fig. 2.     Fig. 3.
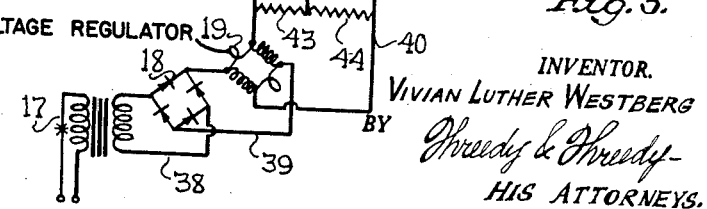
INVENTOR.
VIVIAN LUTHER WESTBERG
BY
Threedy & Threedy
HIS ATTORNEYS.

United States Patent Office 2,913,661
Patented Nov. 17, 1959

2,913,661

SPEED INDICATOR AND SYNCHRONIZER

Vivian Luther Westberg, Napa, Calif.

Application May 22, 1956, Serial No. 586,444

4 Claims. (Cl. 324—69)

My invention relates to new and useful improvements in a speed indicator and synchronizer and has for its principal object the provision of an improved electric circuit including a tachometer for measuring and indicating the speed of rotatable rollers or the like.

Another object of my invention is the provision in a device of this character which permits the simultaneous measuring and indicating of the speed of a plurality of rollers.

Still another object of my invention is the provision in a device of this character of an improved electric circuit which enables the speed of rotation of a plurality of rollers to be measured and indicated.

A further object of my invention is the provision of an improved circuit which permits the speed of a plurality of rotatable members to be indicated, measured, and synchronized.

A further and yet important object of this invention is the provision of an accurate device for measuring the speed of rotation, reciprocation, vibration, or other movement of an apparatus to which it is operatively connected.

Yet another object of the invention is the provision of an improved construction of a device of this character which will be highly efficient in use and economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a diagrammatic view of the device in operation, the dimensional proportions being exaggerated for purposes of illustration;

Fig. 2 is a schematic diagram of the operative circuit of my device;

Fig. 3 is a schematic diagram of a modified operative circuit showing only one impulse sender.

To accomplish the many objects of my invention, I provide in an electric circuit illustrated in Fig. 2, a tachometer 10. This tachometer 10 may be of any approved construction and of the type usually employed for speed-indicating purposes. As shown in Fig. 1, the tachometer 10 has a lead 11' from the power source and circuitry (Fig. 2) and a lead 12' passing to an amplifier and a reversible motor 30 and 34, respectively, and a variable speed device 37, as hereinafter explained. One side of the tachometer 10 by a conductor 11 is connected to a switch blade 12 of a relay switch 13. In the conductor 11 is located a storage condenser 14, the function and purpose of which will be hereinafter explained. The other side of the tachometer 10 from a contact head 15', by a conductor 15, is connected to a complementary contact head 16 of relay switch 13.

From an A.C. power source 17, current is supplied through a rectifier 18 and a voltage regulator 19. These last-mentioned parts are standard electrical devices and perform only their ordinary function when incorporated in my circuit.

By a conductor 20, the positive side of the power source 17 is connected to a contact point 21 of a switch blade of a second relay switch 22. This switch 22 has a secondary switch blade 23 which by conductor 24 connects to a contact point 25 of the tachometer 10. A pulse passing through to the contact head 25 of the tachometer 10 is termed a "bucking" voltage. Such pulse is created in a manner hereinafter described. The switch 22 has a conductor 26 which connects to the conductor 11 as shown in Fig. 2 for a purpose hereinafter explained. In the conductor 26 is a condenser 27 similar to the condenser 14. The conductor 11 connects to a contact head 28 of the tachometer 10 and also by conductor 29 to one side of a D.C. amplifier 30. The other side of the amplifier 30 by conductor 31 is connected to the contact heads 25 and 15' of the tachometer 10.

The amplifier 30 is connected by conductors 32 and 33 to a reversible motor 34 in turn connected by conductors 35 and 36 to a variable speed device 37. Such variable speed device 37 constitutes no part of invention except for its functional connection therewith. The reversible motor 34, the amplifier 30, as well as the variable speed device 37 may be of any standard construction, or of the form and function as disclosed and claimed in the Wills Patent No. 2,423,540. They are indicated here only for purposes of illustration as depicting one utilitarian object of my invention.

The negative side of the power source 17 by conductor 38 is connected to the rectifier 18 and by conductor 39 to voltage regulator 19. From the voltage regulator 19, the negative side of the power passes through conductor 40 to switch head 41 of the relay switch 13. A conductor 42 is connected by resistors 43 and 44 to the positive conductor 20 and negative conductor 40 of the power source 17. This conductor 42 will through the applied laws of electricity function as a negative side for the conductor 20 and positive side for the conductor 40. This conductor 42, together with the conductor 11, connects to the contact point 28 of the tachometer 10 for the purpose hereinafter explained.

Together with the above described tachometer circuit there are employed dual magnetic relays 45 and 46. These magnetic relays are actuated by the rotation of a magnet contained in the friction wheels 47. The construction and operation of such magnetic relays is fully described in my United States Letters Patent No. 2,468,696.

The operation of the magnetic relays 45 and 46 together with the corresponding relay switches 13 and 22 is identical, and for the purpose of this description I shall describe the operation of the magnetic relay 45.

As the wheels 47 engage the rollers to be speed-tested, the magnet within the wheel 47 will rotate, causing a change in the polarity thereof. Such change will affect the relay switch 13, causing the contacts therebetween to change, that is to say, the contact head 16 will be disengaged while the contact head 41 will be made. As the relay 45 functions to make the contact head 41, a circuit to the charging condenser 14 is established from the power source 17 through the conductor 42, condenser 14, contact head 41, conductor 40, back to the negative side of the power source.

When the relay 45 is inoperative, the relay switch 13 again causes the contact head 16 to be engaged. This permits the condenser 14 to send a charge to the tachometer 10. This charge passes through the conductor 11, contact point 28, through the coil between such contact head 28 and contact head 15', to move the indicator needle of the tachometer 10. The pulse then passes through the conductor 15 and contact head 16 to the other side of the condenser 14. At the same time, such pulse is passed from the contact head 28 through conductor 29 to the D.C. amplifier 30. Also, the pulse is passed from the contact point 15' to contact point 25, and, if it be of such strength as to overcome a "bucking" voltage passing from relay 46, the pulse will pass on to conductor 31 to the other side of the amplifier 30 where it will be amplified to effect operation of the motor 34 and the variable speed control unit 37. The "bucking" voltage of relay 46 is created in the same manner as is the pulse of relay 45 hereinbefore described.

The same function and operation is achieved through the magnetic relay 46 and the relay switch 22. Therefore if one of the magnetic relays 45 or 46 is operated a greater number of times, its corresponding condenser will be charged and permitted to discharge a greater number of times than the other, thereby effecting a different amount and amplitude of a pulse passing to the amplifier 30 through the tachometer 10. It is to be understood that the tachometer 10 is common to both relays 45 and 46 and their individual circuits, so that the tachometer 10 will visually indicate by registering thereon the differences in rotatable speeds between the rotatable members or wheels 47. From the foregoing description of the circuits it follows that when the rotatable wheels 47 have identical rotating speeds the tachometer 10 will read zero.

My device may be so employed as to interchange in place of the wheel 47 a flexible cable and coupling which may be mounted directly on a rotatable shaft and, through the above described circuit, the speed of rotation of such shaft can be indicated on the tachometer 10, that is to say, the device may be employed without the overall function of the amplifier 30 and reversible motor 34.

In Fig. 3 I have shown the same circuitry as that disclosed in Fig. 2 except that a variable resistor 48 may be substituted for the second relay 46. The speed of rotation of one of the rollers through a single wheel 47 may then be registered and regulated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An electric apparatus for measuring the speed of rotation of rotatable members and for transmitting a synchronizing signal comprising two parallel circuits adapted to be connected to a common power source, a tachometer common to said circuits for indicating the differences in speed of rotation of said rotatable members, an output circuit for said tachometer, charging condensers in said parallel circuits and operatively connected to the output circuit of said tachometer, switch means in each of said parallel circuits for successively charging its respective condenser from said power source and operatively connecting said condenser to said output circuit.

2. An electric apparatus for measuring the speed of rotation of rotatable members and for transmitting a synchronizing signal comprising two parallel circuits adapted to be connected to a common power source, a tachometer common to said circuits for indicating the differences in speed of rotation of said rotatable members, an output circuit for said tachometer, charging condensers in said parallel circuits and operatively connected to the output circuit of said tachometer, switch means in each of said parallel circuits for successively charging its respective condenser from said power source and operatively connecting said condenser to said output circuit, and means for regulating the amplitude of the charge from said condensers permitted to pass to the output circuit of said tachometer.

3. An electric apparatus for measuring the speed of rotation of rotatable members and for transmitting a synchronizing signal comprising two parallel circuits adapted to be connected to a common power source, a tachometer common to said circuits for indicating the differences in speed of rotation of said rotatable members, an output circuit for said tachometer, charging condensers in said parallel circuits and operatively connected to the output circuit of said tachometer, switch means in each of said parallel circuits for successively charging its respective condenser from said power source and operatively connecting said condenser to said output circuit, and magnetic relay means for operating said switch means with said relay means being responsive to the speed of rotation of said rotatable members.

4. An electric apparatus for measuring the speed of rotation of rotatable members and for transmitting a synchronizing signal comprising two parallel circuits adapted to be connected to a common power source, a tachometer common to said circuits for indicating the differences in speed of rotation of said rotatable members, an output circuit for said tachometer, charging condensers in said parallel circuits and operatively connected to the output circuit of said tachometer, switch means in each of said parallel circuits for successively charging its respective condenser from said power source and operatively connecting said condenser to said output circuit, magnetic relay means for operating said switch means with said relay means being responsive to the speed of rotation of said rotatable members, and means for regulating the amplitude of the charge from said condensers permitted to pass to the output circuit of said tachometer.

References Cited in the file of this patent

UNITED STATES PATENTS

| | | |
|---|---|---|
| 1,665,857 | Needham | Apr. 10, 1928 |
| 2,108,014 | Jones | Feb. 8, 1938 |
| 2,468,696 | Westberg | Apr. 26, 1949 |
| 2,565,892 | Stanton | Aug. 28, 1951 |